April 14, 1936.  C. K. HILL  2,037,235
DRIVE SCREW AND METHOD OF MAKING SAME
Filed Jan. 30, 1934  3 Sheets-Sheet 1

INVENTOR.
Charles K. Hill
BY
Fay, Oberlin & Fay
ATTORNEYS.

April 14, 1936.  C. K. HILL  2,037,235
DRIVE SCREW AND METHOD OF MAKING SAME
Filed Jan. 30, 1934  3 Sheets-Sheet 2
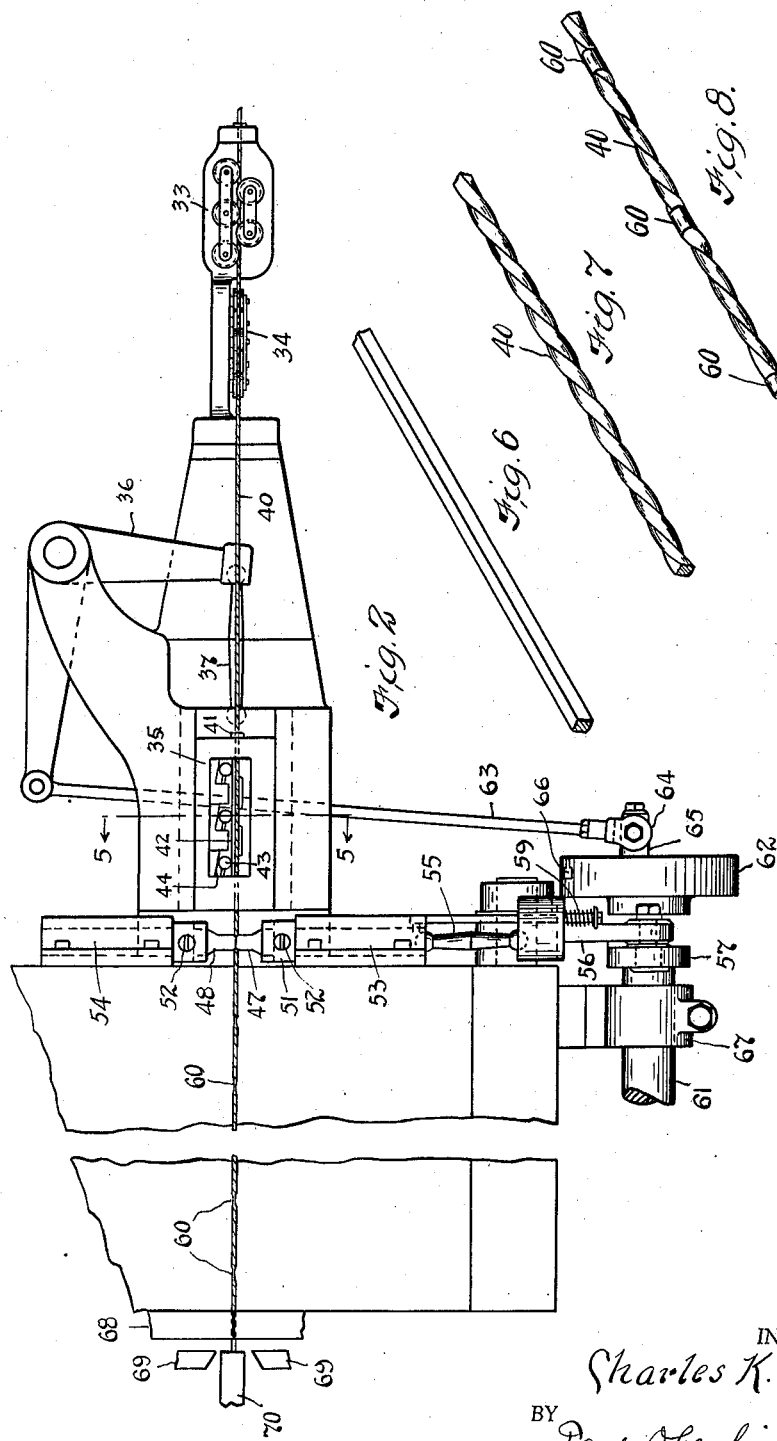
INVENTOR.
Charles K. Hill
BY
Fay, Oberlin & Fay
ATTORNEYS April 14, 1936.　　　C. K. HILL　　　2,037,235
DRIVE SCREW AND METHOD OF MAKING SAME
Filed Jan. 30, 1934　　　3 Sheets-Sheet 3
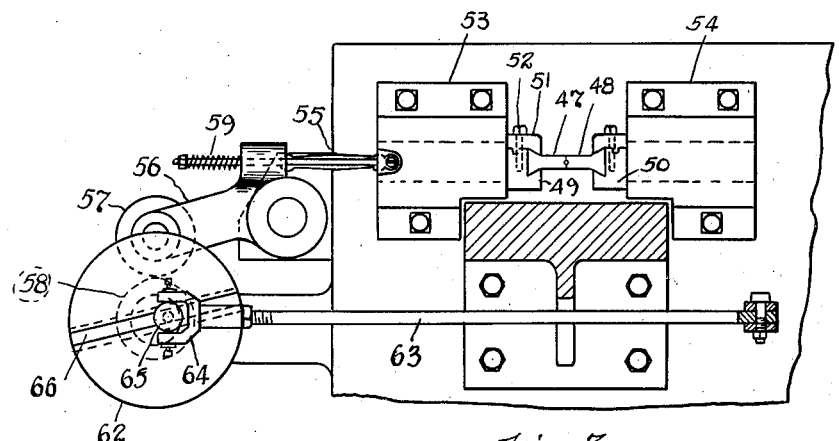
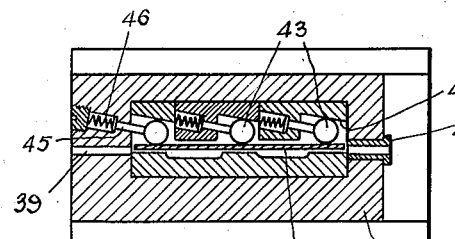
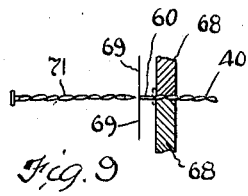
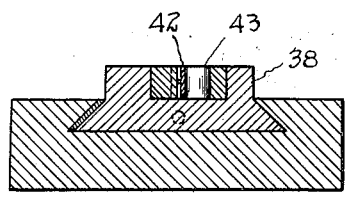
INVENTOR.
Charles K. Hill
BY
Fay, Oberlin & Fay
ATTORNEYS Patented Apr. 14, 1936

2,037,235

UNITED STATES PATENT OFFICE 2,037,235

DRIVE SCREW AND METHOD OF MAKING SAME

Charles K. Hill, Cleveland, Ohio

Application January 30, 1934, Serial No. 708,987

14 Claims. (Cl. 10—54)

This invention relates in general to a method for making nails of the type variously known as drive screws, or screw nails, but has reference more particularly to a method of continuously twisting a length of wire and then continuously forming drive screws or screw nails from this twisted wire.

Drive screws or nails having a threaded shank are very desirable for many classes of work due to the great holding power possessed by this type of nail. However, the cost of their production has been great because heretofore such nails have been made for the most part by forming the nail with a straight shank from an untwisted piece of wire and then imparting a thread to each individual nail by means of dies. This operation is costly and also, where hard and tough metals are used for the nails, as is desirable if full advantage is to be taken of the holding power of the drive screw, the dies quickly become worn out on the hard and tough metal. These considerations have made this type of nail so costly as greatly to limit its use and a method which would reduce this cost would result in wider use of such nails.

The cost of production of this type of nail would be greatly reduced if the threaded shank were made before the nail was cut and formed by twisting the uncut wire stock, and the present invention is intended to provide a method of thus twisting wire preparatory to making drive screws. By the method herein to be described, a complete roll of wire may be twisted and collected into a roll of twisted wire. Ordinarily, a wire having initially a cross-section other than circular will be used in order to develop a useful thread on the twisted wire.

It is accordingly the object of the invention to provide a method of twisting wire continuously and uniformly in any desired length. Another object of the invention is to provide a method of forming nails from twisted wire. Still another object of the invention is to provide a nail having a threaded shank and prepared from hard and tough metal. A further object of the invention is to provide a method of producing nails having threaded shanks in a continuous and economical manner. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of the various mechanical forms in which the principle of the invention may be used.

In said annexed drawings:—

Fig. 2 is a plan view of a nail-making machine particularly adapted for making nails from twisted wire;

Fig. 3 is a front elevation of a portion of the nail-making machine;

Fig. 4 is an enlarged longitudinal section through a wire-feeder forming part of the nail-making machine;

Fig. 5 is a transverse section through the wire-feeder, taken along the line 5—5 of Fig. 2;

Fig. 6 is a view in perspective of a piece of wire having a rectangular cross-section and suitable to be twisted by the present method;

Fig. 7 is a view in perspective of a piece of wire after it has been twisted;

Fig. 8 is a perspective view of a piece of wire with rounded sections, as prepared for the nail-forming operations;

Fig. 9 is a sectional view showing a nail cut-off; and

Fig. 10 is a perspective view of a nail made according to the present method.

Figure 1:
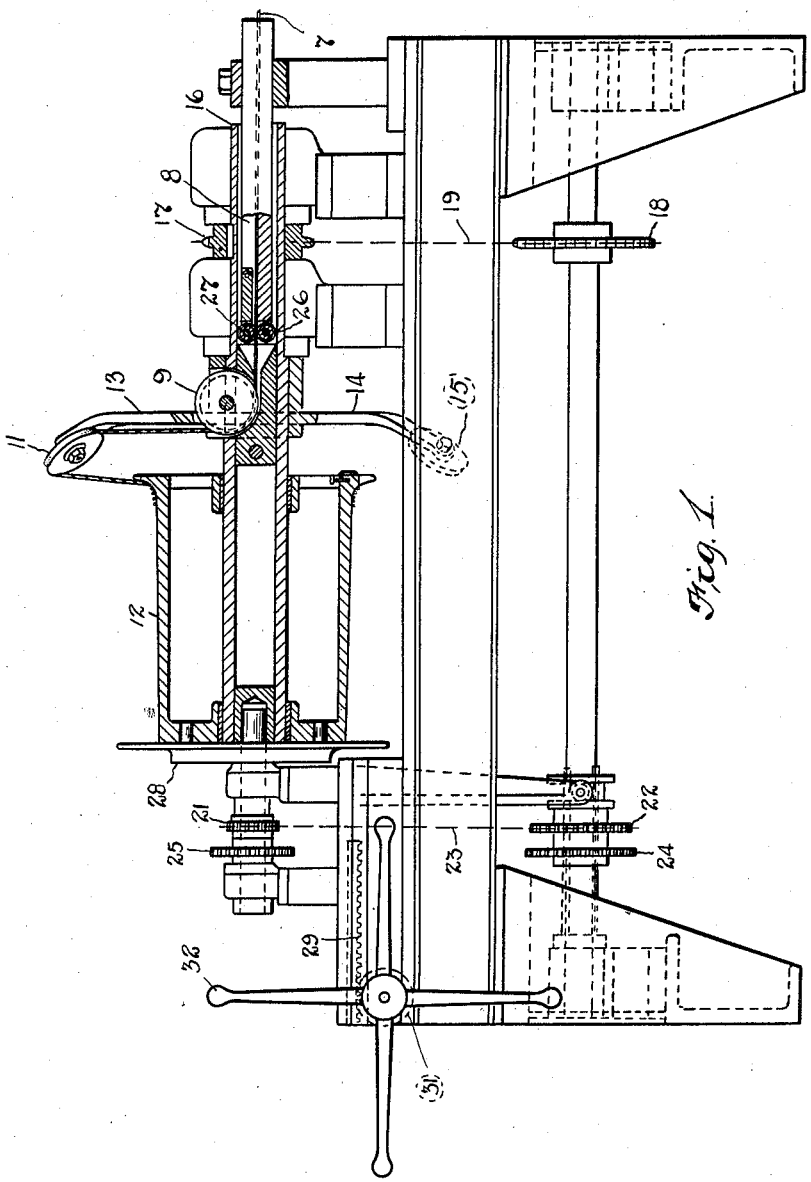
Fig. 1 is a side elevation with parts in section of a wire twisting apparatus designed to carry out the new method.

The new method will be described with relation to the apparatus shown in the drawings, but it will be understood that the method may be carried out by means of apparatus other than that disclosed and it is not intended to limit the method by reference to any particular apparatus.

Referring to Fig. 1, a wire 7 having a cross-section other than round is passed through a stick or wire-holding means 8 and around a grooved wheel 9, the wire being constrained by this grooved wheel to change its direction 90°. The wire then passes over a grooved pulley wheel 11 and from thence to a drum 12 onto which it is wound. The pulley 11 is mounted on a spider 13 and the whole may be balanced by a corresponding spider arm 14 and pulley 15 oppositely disposed. The wheel 9 and the spider 13 carrying the pulley wheel 11 are mounted on a hollow spindle 16 and rotate as a unit. The spindle 16 may be driven through sprockets 17 and 18 by means of a chain 19.

The drum 12 on which the twisted wire is wound, is mounted on the same center of the spider 13, but rotates independently thereof by means of sprockets 21 and 22 connected by the chain 23. A change in the speed of rotation of the drum may be secured by driving the drum through sprockets 24 and 25 having a different gear ratio and it will be obvious that additional sprockets providing other gear ratios may be used. The drum 12 is rotated at a slightly greater speed than the spider 13, the differential drawing the wire through the stick or wire-holding means 8 and over the pulleys 9 and 11 as the wire is wound up. The stick 8 has rollers 26 and 27 which leave a rectangular opening or other opening corresponding to the cross-section of the untwisted wire, so that the wire may pass through this opening, but being held against twisting before this point is reached.

The drum 12 is provided with a removable cover plate or disc 28 which can be drawn back by means of a rack 29 and pinion 31 operated by a hand wheel 32 to permit removal of a roll of twisted wire.

In operation, a wire of any desired cross-section other than round and composed of any metal suitable for forming nails having any desired degree of hardness and toughness, is fed through the stick 8 and over the pulleys 9 and 11 to be wound on the drum 12. The drum 12 is revolved at a slightly greater speed than the spider 13 but about the same center; and the differential speed draws the wire through the apparatus and winds it on the drum. The wire will acquire no twist up to the point where it reaches the rollers 26 and 27, but from this point until the wire passes over the pulley wheel 9, a twist will be imparted to the wire corresponding to the number of revolutions by which the speed of the drum 12 exceeds the speed of the spider 13. The wire cannot untwist as it is formed since the rollers 26 and 27 hold it firmly against any such tendency. A roll of wire of any desired length may be passed through the wire-twisting machine continuously and again rolled up in uniformly twisted condition on the drum 12. This roll can then be pushed off the drum, which is made slightly tapering for this purpose, by removing the cover plate 28.

It should be noted that the twisted wire always contacts first with the forward portion of the drum 12, or, what is the same thing, with the widest portion of the drum. This is possible because the preceding coils of wire continually slip away from the forward end of the drum and onto the narrower portions, since the drum is tapered for this purpose. Consequently, instead of winding the wire in layers one over the other with a constantly increasing winding diameter which would increase the speed with which the wire is drawn through the apparatus, the wire is always wound on a surface of the same diameter and is pulled through the apparatus at the same linear speed. In this way it is not necessary to change the speed of rotation of the drum to compensate for an increasing diameter of bundle, but the drum can be rotated at a constant radial speed while pulling the wire through the machine at a constant linear speed.

The roll of twisted wire produced by the previous step is now passed through the nail-making machine shown in Fig. 2. It will be realized that a twisted wire cannot be cut, headed and pointed, in the conventional manner, but that the wire must be specially prepared for these operations. In the present method the wire, which is in the condition shown in Fig. 7, is passed through wire straighteners 33 and 34. The wire is next engaged by a sliding plate which is caused to reciprocate by the bell crank 36 through the link 37. This sliding plate, as shown in Figs. 4 and 5, consists of the plate 38 having a longitudinal passage 39 through which the wire 40 passes, entering the plate through the bushing 41. A strip of metal 42 lies alongside the wire and rollers 43 contact with this strip. Each roller lies in an orifice having a lateral wall 44 which slopes towards the strip 42 so as to narrow the orifice in the directon from which the wire is being fed, the rollers being normally held in the narrow end of the orifice by plungers 45 acted upon by springs 46. The rollers are otherwise unattached and the strip 42 is also unattached, being free to move laterally a limited distance with respect to the plate 38, that is, radially to the axis of the wire which is fed through this plate. The result of this construction is that, as the plate is drawn backwardly by the bell crank 36 and the link 37, the rollers 43 are forced rearwardly against the springs into the wider part of the orifice where they do not bear on the strip and the plate travels back freely. On the other hand, when the reciprocating plate begins its forward stroke, the friction of the twisted wire on the strip 42 causes the latter to lag behind the sliding plate and to draw the rollers down into the narrow part of the orifices where they exert pressure on the strip which is transmitted to the wire. The effect is that the wire is firmly gripped by the plate 38 and is drawn forward the length of one stroke. In practice, a very small clearance exists between the ends of the strip 42 and the plate 38, so as to permit sufficient movement of the strip longitudinally of the plate to permit the limited radial movement which has been described. The strip 42 need move radially but two or three thousandths of an inch to release the wire, so that the necessary end clearance for the strip 42 need be of the order of only a few thousandths of an inch.

As the wire comes to rest after being drawn forward this amount, it is stamped by jaws 47 and 48 which, as may be seen in Fig. 3, have each a half round depression or indentation in their faces which obliterate the twist in the wire at the point affected, i. e., at intervals measured by the length of stroke at which the sliding plate 38 is operated. The jaws are mounted in holders 49 and 50 respectively, and are held therein by the pieces 51 and the bolts 52. The jaw holders 49 and 50 are respectively mounted in guides 53 and 54, the jaw holder 49 being slidably mounted.

Intermittent motion is imparted to the jaw 47 through a link 55 which connects the jaw holder 49 to a lever 56. This lever has a roller 57 which contacts with a cam 58 which imparts a rocking motion to the lever 56. A spring 59 retracts the jaw after the latter has stamped the wire.

It is necessary in order that nail-forming means may act upon the wire at the rounded portions 60, that these rounded portions be very accurately spaced. In order to effect this accurate spacing, the jaw 47 and the sliding plate 35 are operated from the same source in a synchronized manner. The shaft 61, which imparts a rocking motion to the lever 56 also carries the wheel 62 to which is connected a shaft 63 by means of a fork 64 connected to a key 65 which fits in a key-way 66 in the wheel 62. The shaft 63 connects with the bell crank 36 and thus imparts a reciprocating motion to the plate 35. To regulate the length of the stroke of the slide plate 35, the key 65 may be set at any desired distance from the center of the wheel 62 in the key-way 66 which is cut in the wheel. As this wheel imparts a reciprocating motion to the slide plate, it also revolves the cam 58 which periodically forces the roller 57 outwardly and presses the jaw 47 towards the jaw 48, thereby stamping the wire at the end of each forward stroke of the sliding plate. The wheel 62 and appurtenant parts are supported on the frame of the nail by means of a hanger 67.

The twisted wire 40 which is shown in Fig. 7 now leaves the jaws 47 and 48 and proceeds through the machine with accurately spaced rounded portions 60 thereon, as best seen in Figs. 2 and 8. As each rounded portion 60 reaches the grip jaws 68, the wire is cut off at their rounded portions by knives 69 which are beveled to point the nail, following which a hammer 70 heads the nail, the result being a nail with a threaded shank such as that denominated 71 in Fig. 10.

The entire nail-making operation may be briefly summarized as follows: The wire passes through the straighteners 33 and 34 where it has any bends or kinks taken out, the straightened wire proceeding to the sliding plate 35 where it is periodically gripped and forced through the nail-making machine. The slide plate repeatedly moves freely towards the incoming stock, grips it, and draws it forward an amount approximately equal to the length of a finished nail. Due to the firm grip with which the sliding plate holds the wire, there is no slip and the stock is accurately measured for the finished nail. As before mentioned, the sliding plate releases its grip on the stock while performing the return stroke, and, during this interval, the stock remains at rest to be stamped between the jaws 47 and 48 and given a rounded contour thereby. The twisted wire now has a series of equally spaced rounded sections along its length and proceeds in that form to the gripping jaws 68 which hold the wire while the beveled knives 69 cut the stock at one of the rounded sections. This places the point on one nail which is thus finished and drops into a receiver, while at the same time, providing an end on the succeeding nail which is immediately headed up by the hammer 70. These nail finishing means are of conventional construction and operation, being timed to form the stock at the rounded portions 67.

The new method of making drive screws or screw nails comprises imparting a uniform twist to long wires, wires up to 1800 feet in length having been successfully twisted, although greater or lesser lengths may also be treated. The product of this step in the process may be a roll of twisted wire, such a product not having been heretofore available due to the difficulty of twisting a wire of this length. A wire having any cross-section other than round may be so treated, square, oblong, and oval wires being suitable and a wire having a rectangular section with concave sides being found particularly valuable due to the depth of thread secured when such wire is twisted by the present method. The twisted wire is then taken to the nail-forming machine. The step of forming nails from twisted wire is new, providing a method of handling a twisted wire so that nail-forming operations may be performed thereon accurately and continuously.

Wires of extremely tough and hard metals such as those made from steels containing manganese and carbon may be twisted and the nail produced from this twisted wire is particularly valuable, having great holding power and strength to resist rupture. Drive screws prepared from these metals have been heretofore too expensive to manufacture since the dies used to impart the thread would wear out rapidly. The present method does away with the use of dies, thus lowering the cost of manufacture. Manganese steel drive screws prepared by the present method are very strong and capable of being driven through very hard materials such as thin steel, vulcanized fibre, etc., without bending.

A particularly valuable and useful product adapted to be made by the present method is a drive screw which can be driven into concrete or mortar no matter how old or seasoned the latter are. Such screws are made from steel wire containing from about .40% to about .50% carbon, preferably .45%; from about .40% to about .70% manganese, preferably .60%; sulphur .02% to .03%, and phosphorus .01% to .02%. The wire is drawn to the required size and then annealed at 1400° F., being thoroughly soaked at this temperature and permitted to cool in the furnace or annealing pot. It is then pickled to remove the scale and limed to neutralize the pickling acids.

The wire, as treated in the aforesaid manner, is then formed into drive screws by the method hereinbefore described.

The drive screws are then cleaned and heated to a temperature of from about 1500° F. to about 1550° F. and hardened in water, dried, and drawn in oil at a temperature of about 475° F.–525° F.

These drive screws are especially useful for attaching wooden sleepers, steel or sheet metal, insulation board, etc., to concrete or mortar, no matter how old or seasoned, the screws rotating as they are driven, so that they are virtually self-locking and cannot be pulled out of the concrete or mortar without pulling the portion of the concrete in which they are embedded away from the main body of concrete. The holding power of such concrete screws will become obvious when it is stated that in removing a piece of 2 x 4 from a concrete floor after it has been nailed down with one of these screws, the head of the screw will be drawn through the wood and the screw remain in the concrete undisturbed.

The use of such concrete screws in building construction virtually eliminates the necessity of using the usual type of expensive concrete fastenings, involving expansion bolts, plugs, lead anchors, etc., the cost of fastenings employing such screws being but a small fraction of the cost of the usual type of fastenings embodying expansion bolts, plugs, lead anchors, etc.

This application is a continuation in part of my copending application, Serial Nos. 526,584 and 542,342, and contains claims to subject matter divided out of said co-pending applications.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In the manufacture of threaded-shank nails, shaping a twisted rib wire at spaced intervals to provide rounded sections adapted to be formed into heads.

2. In the manufacture of threaded-shank nails, shaping a twisted rib wire at spaced intervals to provide rounded sections, and cutting the wire at such rounded sections.

3. In the manufacture of threaded-shank nails, shaping a twisted rib wire at spaced intervals to provide rounded sections, cutting the wire at such rounded sections and shaping the rounded sections into rounded heads.

4. In the manufacture of threaded-shank nails, rounding a twisted rib wire at spaced intervals, and cutting the wire and forming at least a portion of such rounded section into a rounded nail head.

5. In the manufacture of threaded-shank nails, rounding a twisted rib wire at spaced intervals, deforming at least a portion of each rounded section into a rounded nail head, and pointing and cutting the wire adjacent one end of the succeeding rounded section.

6. The method of making nails having threaded shanks which comprises uniformly twisting a wire throughout its length, rounding sections of said wire at regular intervals, heading the wire at each of said rounded sections and pointing and cutting the wire at points adjacent the succeeding rounded sections.

7. The method of making nails which comprises uniformly twisting a wire throughout its length, passing said twisted wire through a nail making machine, interrupting the travel of said wire at exact intervals, rounding sections of said wire at such intervals of interruption, heading the wire at each of said rounded sections, and pointing and cutting the wire at points adjacent the succeeding rounded sections.

8. The method of making nails from steel wire containing from about .40% to about .50% carbon and from about .40% to about .70% manganese, which comprises annealing said wire, forming said annealed wire into nails and then hardening said nails.

9. The method of making drive screws from steel wire containing from about .40% to about .50% carbon and from about .40% to about .70% manganese, which comprises annealing said wire, forming said annealed wire into drive screws and then hardening said drive screws.

10. The method of making drive screws from steel wire containing from about .40% to about .50% carbon and from about .40% to about .70% manganese, which comprises annealing said wire uniformly twisting said annealed wire, forming drive screws from said twisted wire and then hardening the drive screws.

11. The method of making drive screws from steel wire containing manganese and carbon which comprises annealing said wire, uniformly twisting said annealed wire, forming drive screws from said twisted wire and then hardening the drive screws.

12. The method of making drive screws from steel wire containing from about .40% to about .50% carbon and from about .40% to about .70% manganese, which comprises annealing said wire at a temperature of about 1400° F., uniformly twisting said annealed wire, forming drive screws from said twisted wire, heating said screws to a temperature of from about 1500° F. to about 1550° F., and then quenching the screws so heated in order to harden the same.

13. The method of making drive screws, nails and pins from steel wire containing in excess of about .50% manganese, which comprises annealing said wire, forming said annealed wire into drive screws, nails or pins, and then hardening the same.

14. The method of making drive screws from steel wire containing in excess of about .50% manganese, which comprises annealing said wire, uniformly twisting said annealed wire, forming drive screws from said twisted wire and then hardening the drive screws.

CHARLES K. HILL.